(12) United States Patent
Sakurai et al.

(10) Patent No.: US 12,287,188 B2
(45) Date of Patent: Apr. 29, 2025

(54) INFORMATION PROCESSING APPARATUS AND INFORMATION PROCESSING METHOD

(71) Applicant: SONY GROUP CORPORATION, Tokyo (JP)

(72) Inventors: Yuta Sakurai, Tokyo (JP); Kazunori Kamio, Tokyo (JP); Satoshi Kawata, Tokyo (JP); Toshiyuki Sasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 239 days.

(21) Appl. No.: 17/998,079

(22) PCT Filed: May 6, 2021

(86) PCT No.: PCT/JP2021/017323
§ 371 (c)(1),
(2) Date: Nov. 7, 2022

(87) PCT Pub. No.: WO2021/230120
PCT Pub. Date: Nov. 18, 2021

(65) Prior Publication Data
US 2023/0184538 A1 Jun. 15, 2023

(30) Foreign Application Priority Data
May 15, 2020 (JP) .................. 2020-086351

(51) Int. Cl.
*G01B 11/02* (2006.01)
*G01C 3/06* (2006.01)

(52) U.S. Cl.
CPC .............. *G01B 11/026* (2013.01); *G01C 3/06* (2013.01)

(58) Field of Classification Search
CPC ...... G01B 11/026; G01C 21/165; G01C 3/06; G06T 7/579; G01S 17/86; G01S 17/89;
(Continued)

(56) References Cited

U.S. PATENT DOCUMENTS

| | | | |
|---|---|---|---|
| 2010/0046802 A1* | 2/2010 | Watanabe | G01S 17/894 348/46 |
| 2014/0063258 A1* | 3/2014 | Schweid | G01S 11/12 348/154 |
| 2018/0278848 A1* | 9/2018 | Nishiyama | H04N 23/6811 |

FOREIGN PATENT DOCUMENTS

| | | |
|---|---|---|
| JP | 2010-071976 A | 4/2010 |
| JP | 2011-043419 A | 3/2011 |

(Continued)

OTHER PUBLICATIONS

International Search Report and Written Opinion of PCT Application No. PCT/JP2021/017323, issued on Aug. 3, 2021, 08 pages of ISRWO.

*Primary Examiner* — Peter B Kim
(74) *Attorney, Agent, or Firm* — CHIP LAW GROUP

(57) ABSTRACT

Provided is an information processing apparatus that includes an estimation unit and a correction unit. The estimation unit estimates a motion vector of a distance measurement target based on distance information on a distance to the distance measurement target input from a distance measuring device that measures the distance to the distance measurement target and motion information of the distance measuring device input from a motion detection device that detects a motion of the distance measuring device. The correction unit corrects the distance information based on the motion vector of the distance measurement target estimated by the estimation unit.

9 Claims, 7 Drawing Sheets

(58) Field of Classification Search
CPC ...... G01S 17/894; G01S 17/36; G01S 7/4808; G01S 7/497
See application file for complete search history.

(56) References Cited

FOREIGN PATENT DOCUMENTS

| | | |
|---|---|---|
| JP | 2018-160235 A | 10/2018 |
| JP | 2019-124537 A | 7/2019 |
| WO | 2019/138868 A1 | 7/2019 |

\* cited by examiner

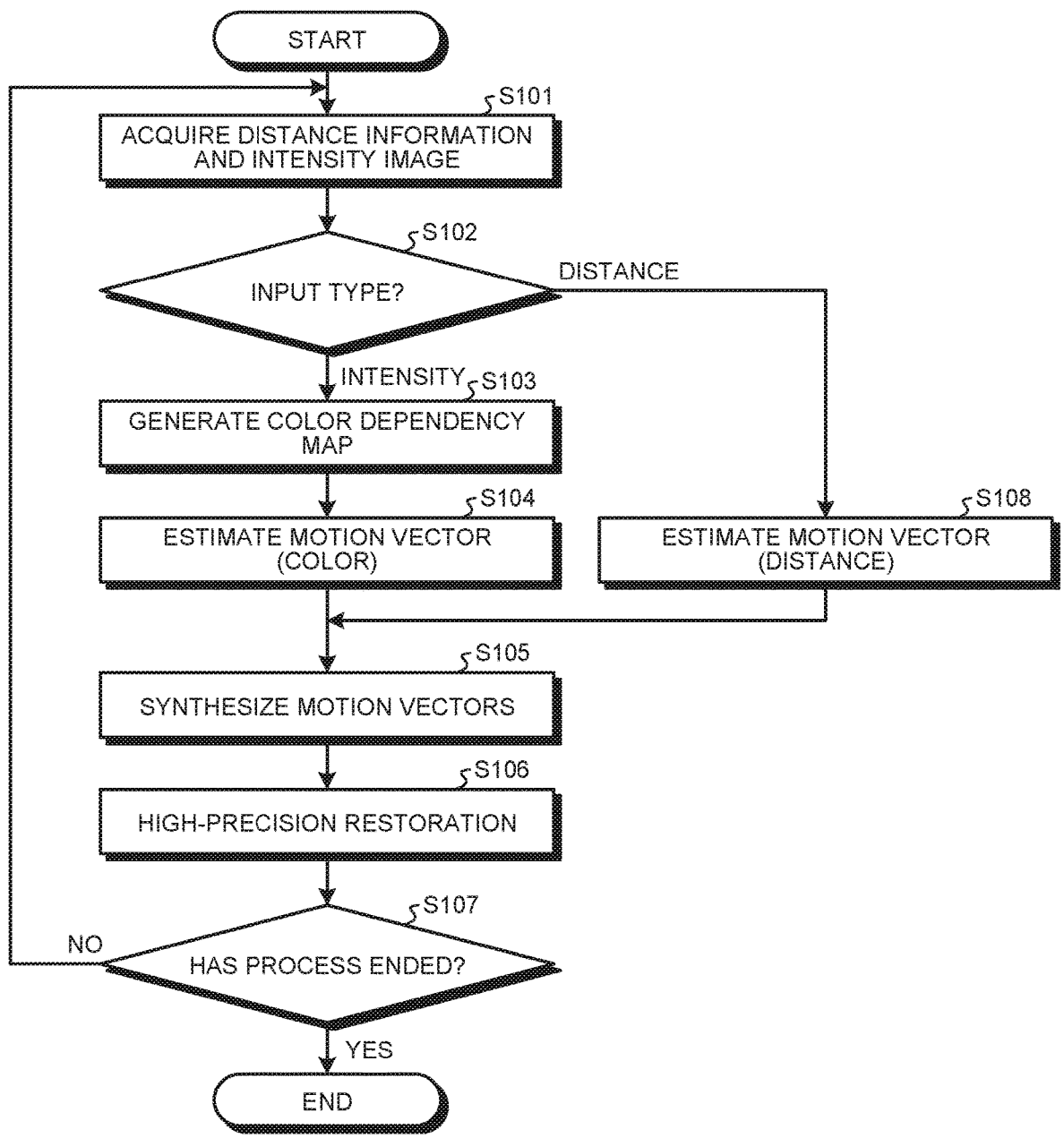

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/017323 filed on May 6, 2021, which claims priority benefit of Japanese Patent Application No. JP 2020-086351 filed in the Japan Patent Office on May 15, 2020. Each of the above-referenced applications is hereby incorporated herein by reference in its entirety.

FIELD

The present disclosure relates to an information processing apparatus, an information processing method, and an information processing program.

BACKGROUND

There is an information processing apparatus that improves distance measurement accuracy based on distance information on a distance to a distance measurement target detected by a distance sensor and a visible light image of the distance measurement target captured by an imaging device (for example, Patent Literature 1).

CITATION LIST

Patent Literature

Patent Literature 1: JP 2019-124537 A

SUMMARY

Technical Problem

However, in the above-described conventional technology, since an imaging device that captures a visible light image is used to improve distance measurement accuracy, the distance measurement accuracy may be deteriorated in a dark place or in a backlight condition.

Therefore, the present disclosure proposes an information processing apparatus, an information processing method, and an information processing program capable of improving the distance measurement accuracy even in a dark place or in a backlight condition.

Solution to Problem

According to the present disclosure, An information processing apparatus is provided. The information processing apparatus includes an estimation unit and a correction unit. The estimation unit estimates a motion vector of a distance measurement target based on distance information on a distance to the distance measurement target input from a distance measuring device that measures the distance to the distance measurement target and motion information of the distance measuring device input from a motion detection device that detects a motion of the distance measuring device. The correction unit corrects the distance information based on the motion vector of the distance measurement target estimated by the estimation unit.

BRIEF DESCRIPTION OF DRAWINGS

FIG. 9 is a flowchart illustrating an example of a process executed by the information processing apparatus according to the present disclosure.

DESCRIPTION OF EMBODIMENTS

Hereinafter, embodiments of the present disclosure will be described with reference to the drawings. In each of the following embodiments, same parts are given the same reference signs to omit redundant description.

[1. Configuration of Information Processing Apparatus]

Figure 1:
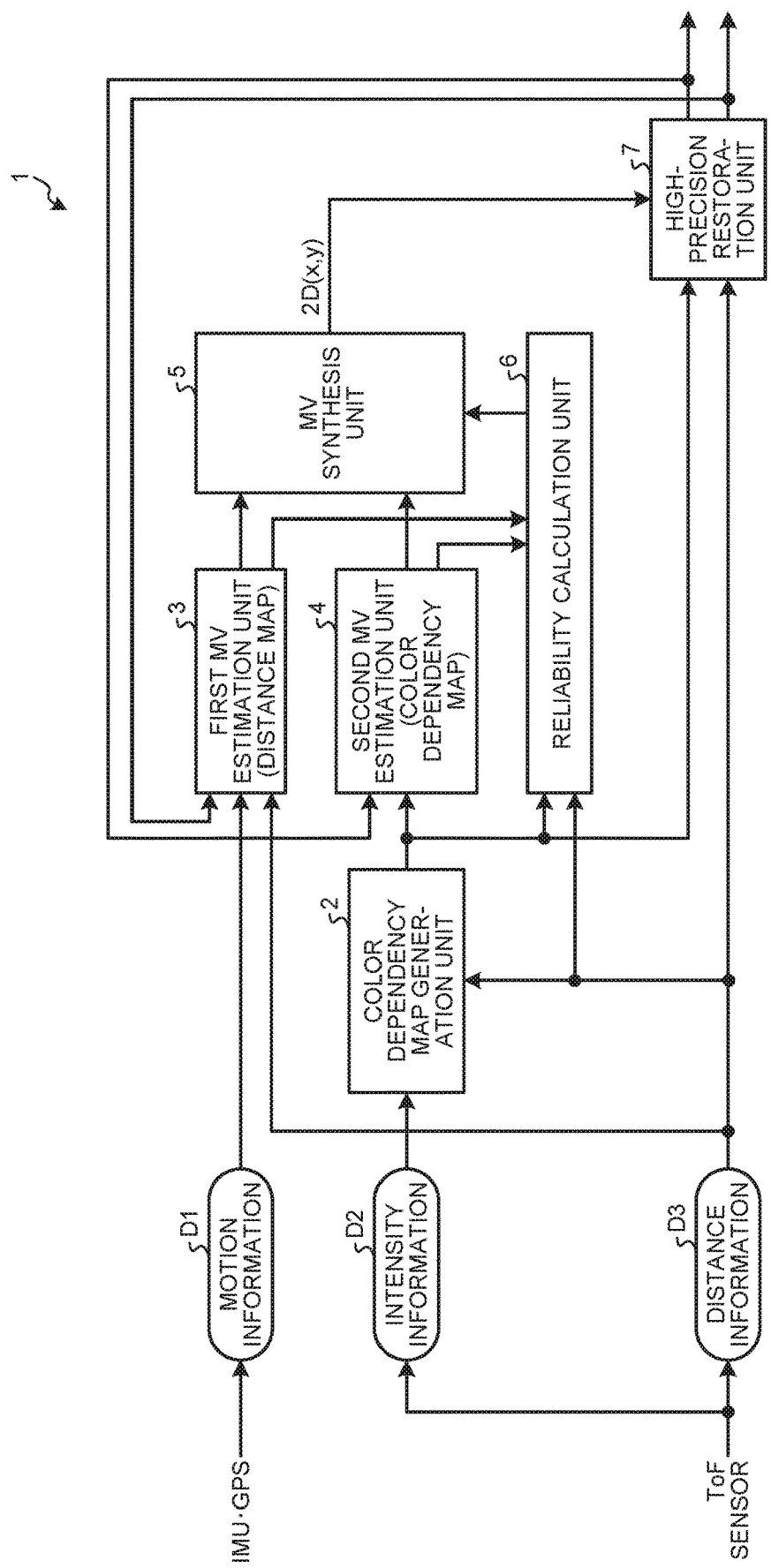
FIG. 1 is a block diagram illustrating an example of a configuration of an information processing apparatus according to the present disclosure.

FIG. 1 is a block diagram illustrating an example of a configuration of an information processing apparatus according to the present disclosure. An information processing apparatus 1 includes a microcomputer having a central processing unit (CPU), a read only memory (ROM), and a random access memory (RAM), and various circuits.

As illustrated in FIG. 1, the information processing apparatus 1 is provided with a plurality of processing units that functions when the CPU executes a program stored in the ROM by using the RAM as a work area. Specifically, the information processing apparatus 1 is provided with a color dependency map generation unit 2, a first motion vector (MV) estimation unit 3, a second MV estimation unit 4, an MV synthesis unit 5, a reliability calculation unit 6, and a high-precision restoration unit 7.

Note that some or all of the plurality of processing units included in the information processing apparatus 1 may be configured by hardware such as an application specific integrated circuit (ASIC) or a field programmable gate array (FPGA).

Each of the plurality of processing units described above included in the information processing apparatus 1 implements or executes an action of information processing described below. Note that an internal configuration of the information processing apparatus 1 is not limited to the configuration illustrated in FIG. 1, and may be another configuration as long as information processing to be described later is performed.

The information processing apparatus 1 is connected to a distance measuring device that measures a distance to a distance measurement target and a motion detection device that detects motion information of the distance measuring device. Here, a case where the distance measuring device is a time of flight (ToF) sensor and the motion detection device is an inertial measurement unit (IMU) or global positioning system (GPS) sensor will be described.

Note that the distance measuring device is not limited to the ToF sensor, and may be another distance measuring sensor such as LiDAR, LADAR, or a stereo camera. In addition, the motion detection device may include both the IMU and GPS sensors.

The ToF sensor includes a light emitting unit that emits infrared light, and a light receiving unit in which light receiving elements that receive reflected light obtained by reflecting the emitted infrared light by the distance measurement target are arranged in a matrix. The ToF sensor measures a distance to the distance measurement target based on time from emission of infrared light to reception of reflected light. Note that the ToF sensor may be an indirect ToF sensor that measures the distance to the distance measurement target based on a phase difference between a light emission timing of infrared light and a light reception timing of reflected light.

The light receiving unit of the ToF sensor functions as an imaging device, and can capture a distance image in which a luminance value of each pixel becomes a luminance value according to the distance to the distance measurement target. Furthermore, the ToF sensor can also capture an intensity image in which a luminance value of each pixel corresponds to a reflection intensity of infrared light from the distance measurement target. The luminance value of each pixel of the intensity image changes depending on the distance to the distance measurement target and color of the distance measurement target.

Therefore, a first MV estimation unit 3 acquires information on distance images captured in time series by the ToF sensor as distance information D3. At this point, the first MV estimation unit 3 acquires a distance map indicating distribution of the distance to the distance measurement target in the distance image as the distance information D3. In addition, the first MV estimation unit 3 acquires, for example, from the IMU, motion information D1 indicating a position and orientation of the ToF sensor.

The first MV estimation unit 3 estimates a motion vector of the distance measurement target in the distance image based on the motion information D1 and the distance information D3. Here, the first MV estimation unit 3 estimates the motion vector of the distance measurement target from the distance image of a past frame toward the distance image of a current frame. Note that details of a motion vector estimation process will be described later with reference to FIG. 2. The first MV estimation unit 3 outputs an estimated motion vector to the MV synthesis unit 5 and the reliability calculation unit 6.

The color dependency map generation unit 2 acquires information on intensity images captured in time series by the ToF sensor as intensity information D2, and acquires information on distance images captured in time series as the distance information D3. The color dependency map generation unit 2 generates a color dependency map based on the intensity information D2 and the distance information D3, and outputs a color dependency map to the second MV estimation unit 4, the reliability calculation unit 6, and the high-precision restoration unit 7. Details of a color dependency map generation process will be described later with reference to FIG. 4.

The second MV estimation unit 4 estimates a motion vector of the distance measurement target in the intensity image based on the color dependency map input from the color dependency map generation unit 2. Here, the second MV estimation unit 4 estimates the motion vector of the distance measurement target from the intensity image of the past frame toward the intensity image of the current frame. Note that details of a motion vector estimation process will be described later with reference to FIG. 2. The second MV estimation unit 4 outputs the estimated motion vector to the MV synthesis unit 5 and the reliability calculation unit 6.

The reliability calculation unit 6 calculates reliability of each motion vector based on the distance information D3 that is the distance map, the color dependency map, the motion vector estimated based on the distance map, and the motion vector estimated based on the color dependency map.

In other words, the reliability calculation unit 6 calculates reliability of the motion vector of the distance measurement target estimated by the first MV estimation unit 3 and reliability of the motion vector of the distance measurement target estimated by the second MV estimation unit 4. Details of a reliability calculation process will be described later with reference to FIG. 7. The reliability calculation unit 6 outputs calculated reliability of each motion vector to the MV synthesis unit 5.

The MV synthesis unit 5 synthesizes a first motion vector estimated by the first MV estimation unit 3 and a second motion vector estimated by the second MV estimation unit 4, and outputs a two-dimensional position of the distance measurement target in the distance image and the intensity image to the high-precision restoration unit 7. Here, the MV synthesis unit 5 synthesizes the motion vectors at a ratio corresponding to the reliability of the motion vectors calculated by the reliability calculation unit 6.

The high-precision restoration unit 7 combines the distance information D3, which is the distance map, with the color dependency map, and restores and outputs the distance to the distance measurement target based on a composite image. Here, the high-precision restoration unit 7 corrects and restores the distance to the distance measurement target by correcting the composite image based on the two-dimensional position of the distance measurement target in the distance image and the intensity image input from the MV synthesis unit 5. In this manner, the high-precision restoration unit 7 functions as a correction unit that corrects the distance information D3 based on the motion vector estimated by the first MV estimation unit 3 and the motion vector estimated by the second MV estimation unit 4.

In addition, the high-precision restoration unit 7 simultaneously improves the accuracy of the color dependency map and feeds back the improved accuracy in order to improve the MV estimation accuracy. The high-precision restoration unit 7 outputs and feeds back the distance information D3 to the first MV estimation unit 3, and outputs and feeds back the color dependency map to the second MV estimation unit 4.

Details of a high-precision restoration method of the distance to the distance measurement target by the high-precision restoration unit 7 will be described later with reference to FIG. 8. The high-precision restoration unit 7 also outputs a corrected color dependency map to the first MV estimation unit 3 and the second MV estimation unit 4. The first MV estimation unit 3 and the second MV estimation unit 4 use the color dependency map input from the high-precision restoration unit 7 for estimating the motion vector of the distance measurement target in an image of a next frame.

As described above, the information processing apparatus 1 estimates the motion vector of the distance measurement target based on the distance information D3 on the distance to the distance measurement target input from the ToF sensor that measures the distance to the distance measurement target and the motion information D1 of the ToF sensor input from the IMU that detects the motion of the ToF sensor.

Then, the information processing apparatus 1 corrects the distance information based on the estimated motion vector of the distance measurement target. In other words, since the information processing apparatus 1 corrects a distance measurement result of the ToF sensor, which is the distance measuring device, according to the motion of the ToF sensor, it is possible to improve the distance measurement accuracy.

Furthermore, since the motion information D1 detected by the IMU is not affected by surrounding brightness, the distance measurement accuracy is not deteriorated in a dark place or in a backlight condition as in information processing of correcting a distance measurement result using a visible light image. Therefore, the information processing apparatus 1 can improve the distance measurement accuracy even in a dark place or in a backlight condition.

[2. Motion Vector Estimation Process]

Figure 2:
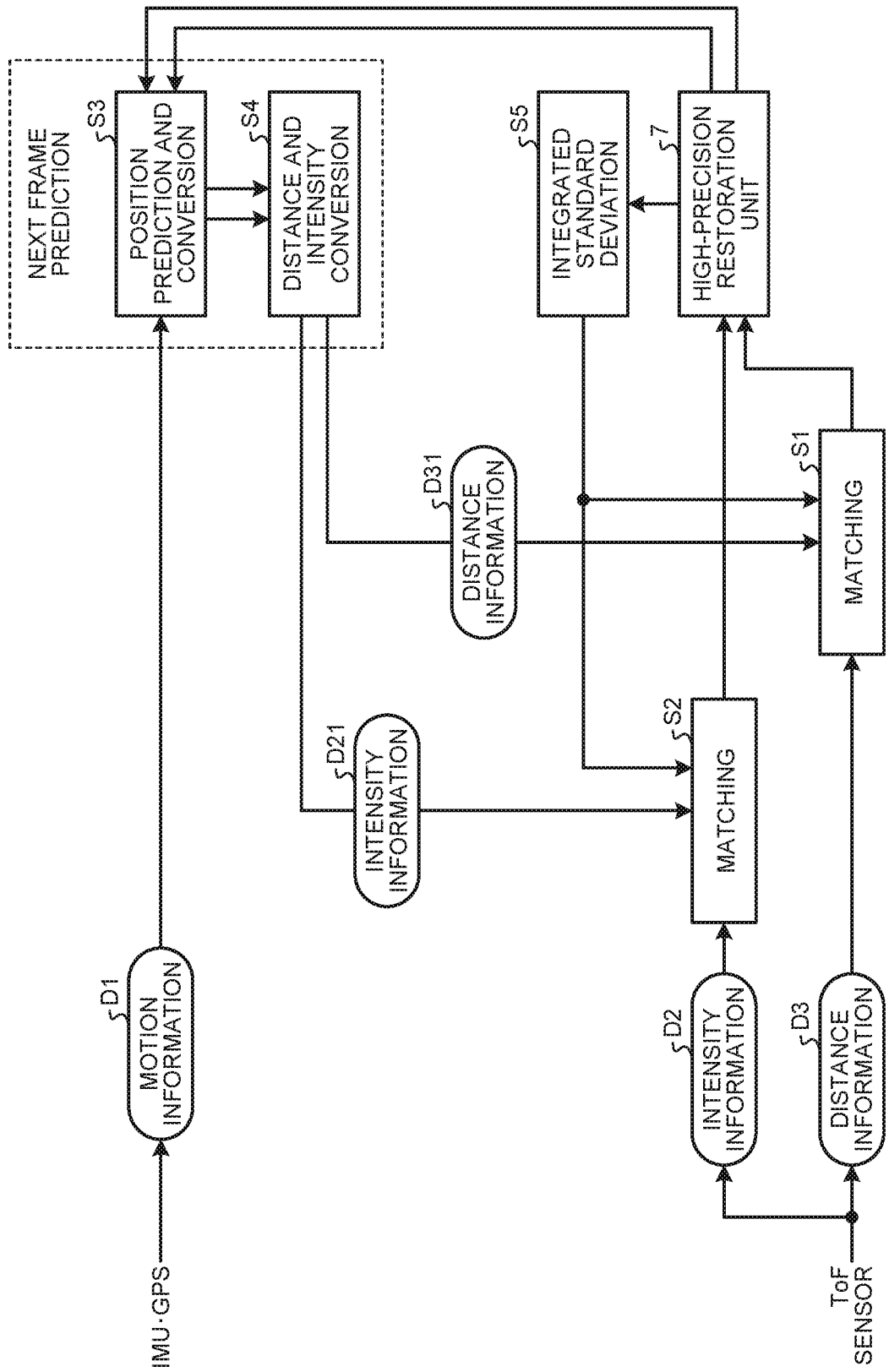
FIG. 2 is an explanatory diagram of a motion vector estimation process according to the present disclosure.
Figure 3:
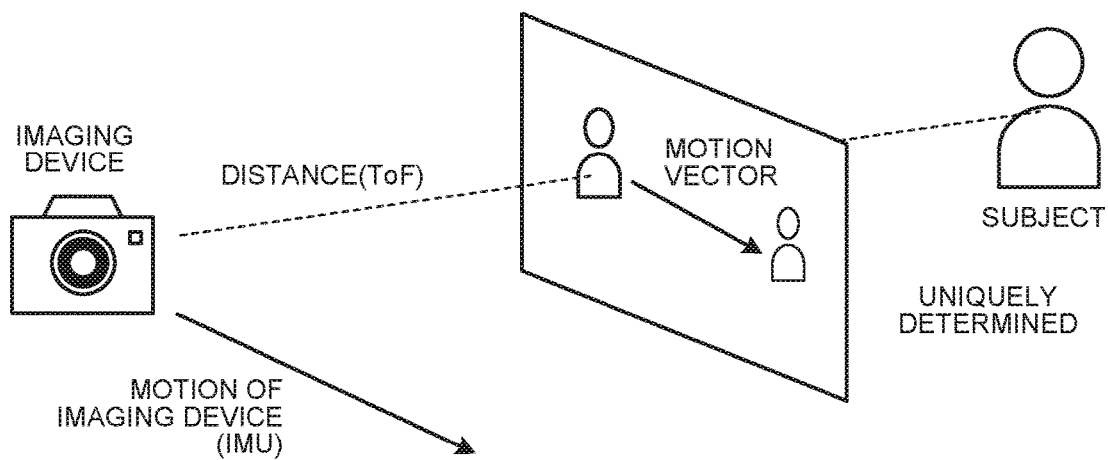
FIG. 3 is a three-dimensional relationship diagram of an imaging device, an image plane, and a subject according to the present disclosure.

FIG. 2 is an explanatory diagram of the motion vector estimation process according to the present disclosure. FIG. 3 is a three-dimensional relationship diagram of the imaging device, an image plane, and a subject according to the present disclosure.

As illustrated in FIG. 2, the first MV estimation unit 3 estimates the motion vector by matching the distance information D3, which is the distance map in the current frame input from the ToF sensor, with distance information D31, which is the distance map in a previous frame (Step S1).

At this point, based on the motion information of the ToF sensor input from the IMU, the first MV estimation unit 3 converts the position of the distance measurement target in an image of the previous frame input from the high-precision restoration unit 7 into the position of the distance measurement target in an image of the current frame to predict the position (Step S3).

As illustrated in FIG. 3, when the subject that is the distance measurement target is still, a position of the subject in the image of the current frame is uniquely determined by Expression (1) below, where $X_S$ represents coordinates of the subject in the image of the current frame, t represents a translation vector of the ToF sensor serving as the imaging device, and λ represents the distance to the subject.

$$X_s = \frac{1}{\lambda} P(RX_w + T) \quad (1)$$

$X_S$: Coordinates in image,
$X_W$: Three-dimensional coordinates in actual world coordinate system,
λ: Distance, P: Internal parameter matrix, R: Rotation matrix,
t: Translation vector In addition, when the position of the distance measurement target changes between the image of the previous frame and the image of the current frame, the distance to the distance measurement target also changes according to a change amount of the position. Therefore, the first MV estimation unit 3 generates the distance information D31 by converting the position of the distance measurement target in the image of the current frame into the distance to the distance measurement target in the image of the current frame based on the change amount of the position of the distance measurement target (Step S4).

The first MV estimation unit 3 matches the distance information D31 generated in this manner with the distance information D3 of the current frame and outputs a result to the high-precision restoration unit 7. Note that, although not illustrated here, the first MV estimation unit 3 outputs the motion vector of the distance measurement target estimated based on the distance map to the MV synthesis unit 5.

An integrated standard deviation regarding a distance of each pixel in the image of the distance measurement target is input from the high-precision restoration unit 7 to the first MV estimation unit 3 (Step S5). When the integrated standard deviation of the position of the distance measurement target is large (equal to or larger than a predetermined threshold), the first MV estimation unit 3 expands a range to search pixel distance candidates.

Further, the second MV estimation unit 4 estimates the motion vector by matching the intensity information D2, which is the color dependency map of the current frame input from the ToF sensor, with intensity information D21, which is the color dependency map of the previous frame (Step S2).

At this point, based on the motion information of the ToF sensor input from the IMU, the second MV estimation unit 4 converts the position of the distance measurement target in the image of previous frame input from the high-precision restoration unit 7 into the position of the distance measurement target in the image of the current frame to predict the position (Step S3).

In addition, when the position of the distance measurement target changes between the image of the previous frame and the image of the current frame, the reflection intensity of the infrared light also changes according to the change amount of the position. Therefore, the second MV estimation unit 4 generates the intensity information D21 by converting the position of the distance measurement target in the image of the current frame into the reflection intensity of the image of the current frame based on the change amount of the position of the distance measurement target (Step S4).

The second MV estimation unit 4 matches the intensity information D21 generated in this manner with the intensity information D2 of the current frame, and outputs a result to the high-precision restoration unit 7. Note that, although not illustrated here, the second MV estimation unit 4 outputs the motion vector of the distance measurement target, estimated based on the color dependency map, to the MV synthesis unit 5.

Note that the second MV estimation unit 4 receives the integrated standard deviation regarding luminance of the image of the distance measurement target from the high-precision restoration unit 7 (Step S5). When the integrated standard deviation of the luminance of the distance measurement target is large (equal to or larger than the predetermined threshold), the second MV estimation unit 4 expands a range to search position candidates.

[3. Method of Creating Color Dependency Map]

Figure 4:
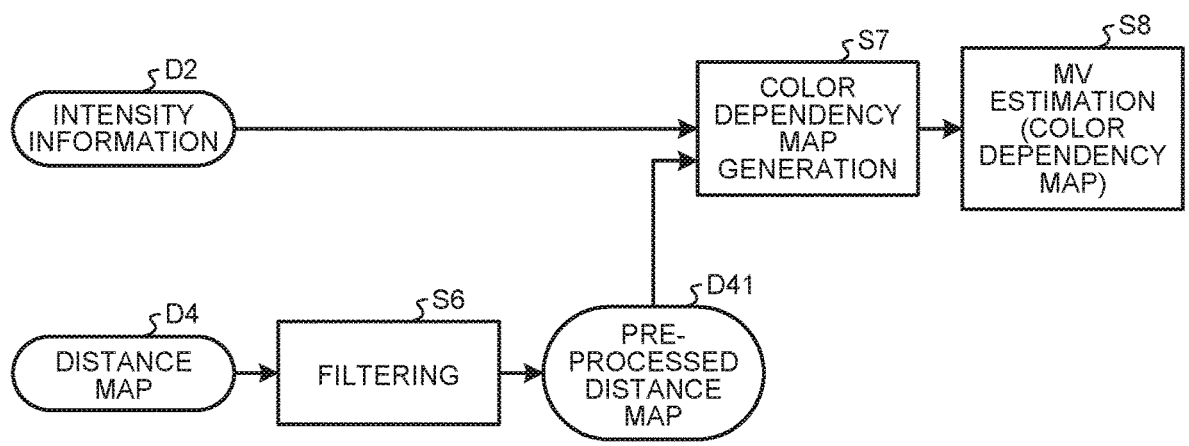
FIG. 4 is an explanatory diagram of a method of creating a color dependency map according to the present disclosure.
Figure 5:
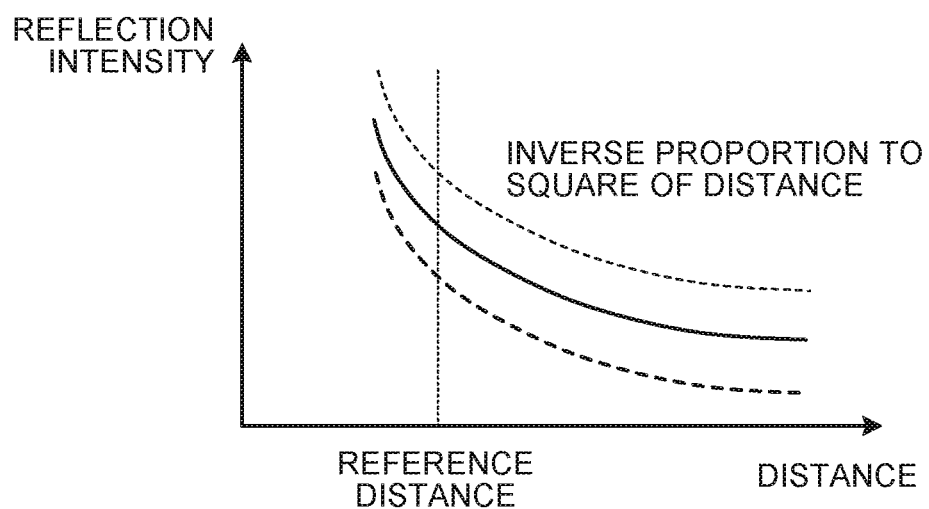
FIG. 5 is a diagram illustrating a relationship between a distance to a distance measurement target and reflection intensity of infrared light according to the present disclosure.
Figure 6:
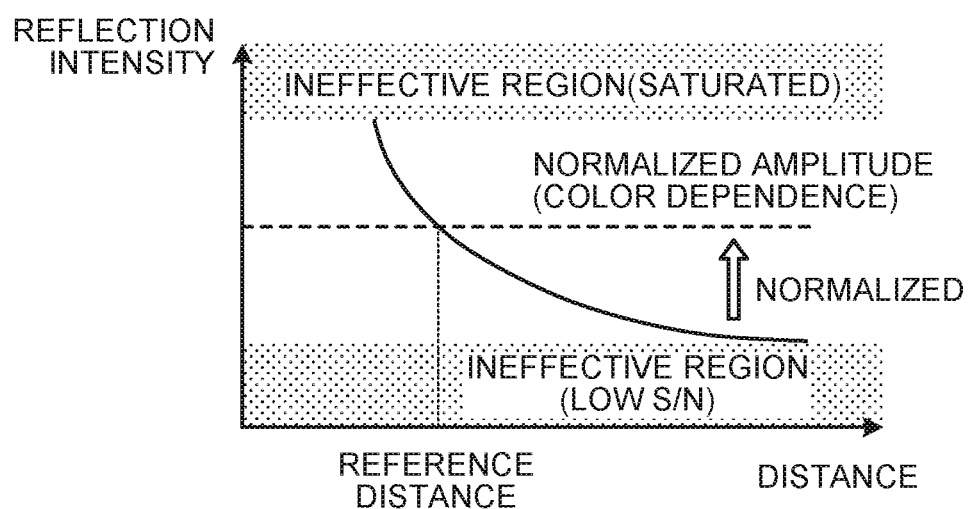
FIG. 6 is an explanatory diagram of a method of normalizing the reflection intensity according to the present disclosure.

FIG. 4 is an explanatory diagram of a method of creating the color dependency map according to the present disclosure. FIG. 5 is a diagram illustrating a relationship between the distance to the distance measurement target and the reflection intensity of infrared light according to the present disclosure. FIG. 6 is an explanatory diagram of a method of normalizing the reflection intensity according to the present disclosure.

Infrared light reflection intensity distribution included in the intensity information D2 depends on the color of the distance measurement target and the distance to the distance measurement target. In other words, the intensity information D2 includes information on a color-dependent component and information on a distance-dependent component. Therefore, the color dependency map generation unit 2 first filters a distance map D4 (Step S6) and generates a preprocessed distance map D41 after filtering.

Then, the color dependency map generation unit 2 generates the color dependency map including only the color-dependent component by removing the distance-dependent component from the intensity information D2 using the preprocessed distance map D41 (Step S7). The reflection intensity of the infrared light included in the color dependency map generated in this manner varies in inverse proportion to the square of the distance as illustrated in FIG. 5.

Therefore, as indicated by a broken line in FIG. 6, the reflection intensity of the infrared light included in the color dependency map is normalized so that the reflection intensity becomes constant regardless of the distance to the distance measurement target, and the final color dependency map is generated. Then, the second MV estimation unit 4 estimates the motion vector (MV) of the distance measurement target in the intensity image using the color dependency map generated by the color dependency map generation unit 2 (Step S8).

[4. Reliability Calculation Method]

Figure 7:
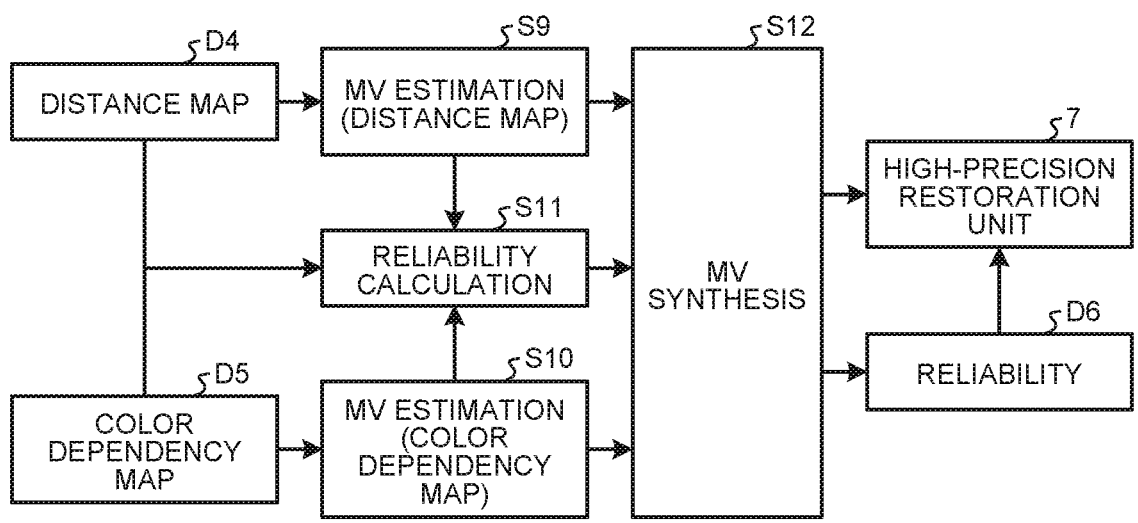
FIG. 7 is an explanatory diagram of a reliability calculation method according to the present disclosure.

FIG. 7 is an explanatory diagram of a reliability calculation method according to the present disclosure. As illustrated in FIG. 7, prior to the reliability calculation, the first MV estimation unit 3 first estimates MV based on the distance map D4 (Step S9). The second MV estimation unit 4 also estimates MV based on the color dependency map D5 (Step S10).

The reliability calculation unit 6 calculates the reliability of the position of the distance measurement target in the distance map D4 based on the distance map D4 and the motion vector estimated based on the distance map D4 (Step S11). The reliability calculation unit 6 calculates high reliability for a flat portion in the distance map D4. On the other hand, the reliability calculation unit 6 calculates low reliability for an uneven portion and an edge portion in the distance map D4.

In addition, the reliability calculation unit 6 calculates the reliability of the position of the distance measurement target in the color dependency map D5 based on the color dependency map D5 and the motion vector estimated based on the color dependency map D5 (Step S11). The reliability calculation unit 6 calculates the reliability by evaluating a sharpness of the uneven portion and the edge portion of the distance measurement target from texture information of the distance measurement target in the color dependency map D5.

The MV synthesis unit 5 synthesizes the motion vector estimated based on the distance map D4 and the motion vector estimated based on the color dependency map D5 according to the reliability calculated by the reliability calculation unit 6 (Step S12).

The MV synthesis unit 5 performs MV synthesis by using, for example, Expression (2) below and adopting a motion vector with higher reliability of each pixel. Note that the MV synthesis unit 5 can also perform MV synthesis by performing weighting according to the reliability of each pixel.

$$\tilde{I}(i)=\alpha(\text{Conf},\sigma)\hat{I}(i)+(1-\alpha(\text{Conf},\sigma))\tilde{I}(i-1) \quad (2)$$

$\tilde{I}(i)$: Added image in i frame,
$\hat{I}(i)$: Input image in i frame,
$\alpha(\text{Conf}, \sigma)$: Function based on reliability and standard deviation (Function determining weight coefficient)

The high-precision restoration unit 7 adds the distance map D4 and the color dependency map D5 according to the reliability used for the MV synthesis to generate a synthesized image, and corrects the synthesized image based on the motion vector after the MV synthesis, thereby correcting and restoring the distance to the distance measurement target.

[5. High-Precision Distance Restoration Method]

Figure 8:
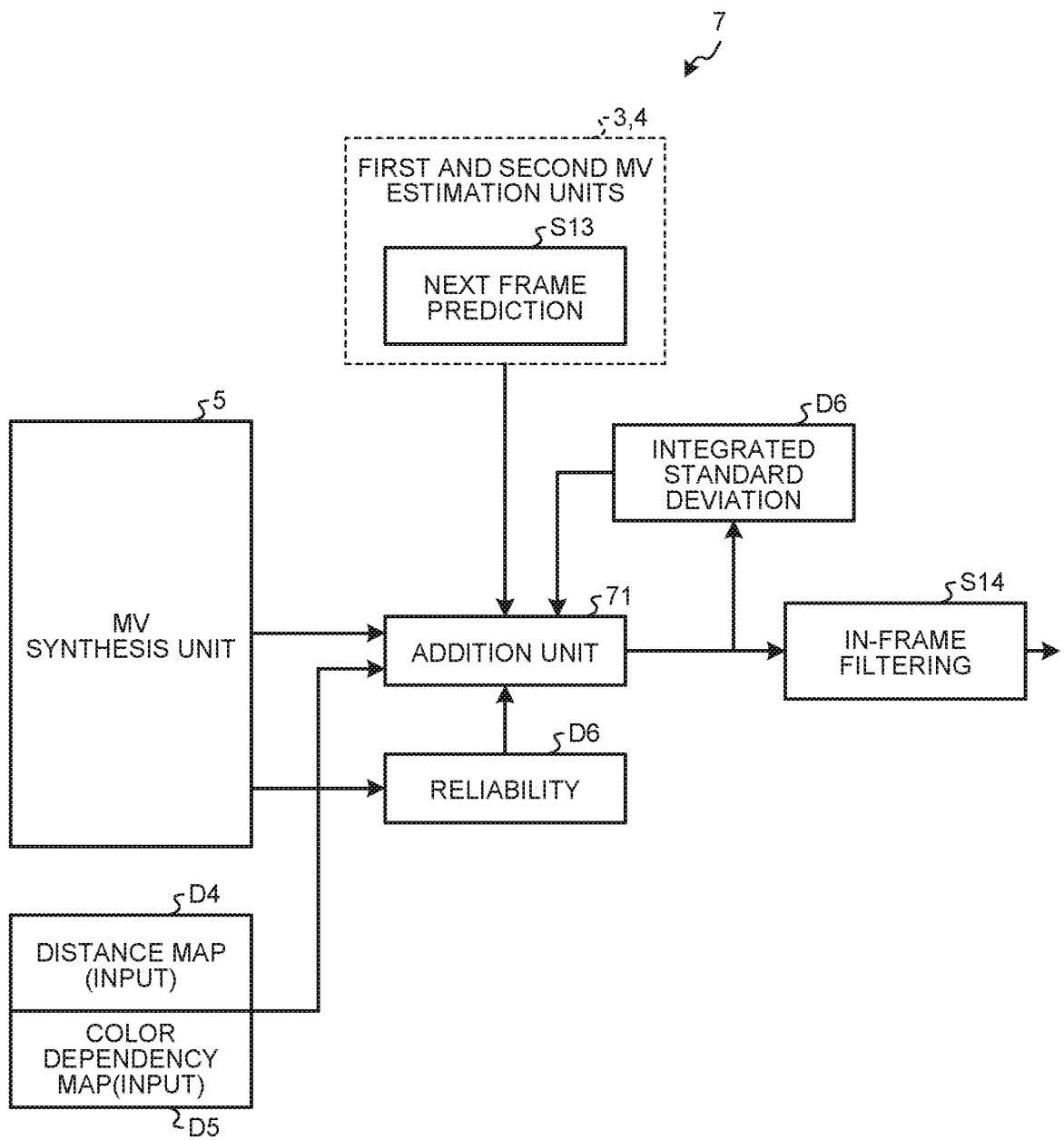
FIG. 8 is an explanatory diagram of a high-precision restoration method of the distance to the distance measurement target according to the present disclosure.

FIG. 8 is an explanatory diagram of the high-precision restoration method of the distance to the distance measurement target according to the present disclosure. As illustrated in FIG. 8, the high-precision restoration unit 7 includes an addition unit 71. The first MV estimation unit 3 and the second MV estimation unit 4 perform next frame prediction (Step S13). Here, the first MV estimation unit 3 and the second MV estimation unit 4 predict the position of the distance measurement target in the image of the next frame. The first MV estimation unit 3 and the second MV estimation unit 4 output the predicted position of the distance measurement target in the image of the next frame to the addition unit 71.

The addition unit 71 acquires the synthesized motion vector and the reliability used for the synthesis of the motion vectors from the MV synthesis unit 5. Then, the addition unit 71 acquires the distance map D4 and the color dependency map D5. The MV synthesis unit 5 adds the distance map D4 and the color dependency map D5 to generate a synthesized image.

At this point, the MV synthesis unit 5 adjusts an addition ratio between the synthesized image up to the previous frame and the image of the current frame by using the integrated standard deviation regarding the luminance of the image of the distance measurement target calculated based on the past addition result and the reliability used for the synthesis of the motion vector.

In addition, the MV synthesis unit 5 calculates the measurement distance in each pixel and the standard deviation of the reflection intensity of the infrared light, and adjusts the range to search the distance measurement target and the addition coefficient used by the addition unit 71 when desired performance cannot be obtained although a plurality of images is added. Thereafter, the high-precision restoration unit 7 performs in-frame filtering on the synthesized image (Step S14), and restores the distance to the distance measurement target based on the synthesized image after filtering.

[6. Process Executed by Information Processing Apparatus]

Next, a process executed by the information processing apparatus according to the present disclosure will be described with reference to FIG. 9. FIG. 9 is a flowchart illustrating an example of the process executed by the information processing apparatus according to the present disclosure. As illustrated in FIG. 9, the information processing apparatus 1 first acquires the distance information and the intensity image (Step S101).

Subsequently, the information processing apparatus 1 determines whether an input type is distance or intensity (Step S102). Then, when the information processing apparatus 1 determines that the input is the distance (Step S102, distance), the information processing apparatus 1 estimates the motion vector of the distance measurement target based on the distance map (Step S108), and proceeds to Step S105.

Furthermore, when the information processing apparatus 1 determines that the input is the intensity (Step S102, intensity), the information processing apparatus 1 generates the color dependency map (Step S103), estimates the motion vector of the distance measurement target based on the color dependency map (Step S104), and proceeds to Step S105.

In Step S105, the information processing apparatus 1 synthesizes the motion vectors estimated in Steps S104 and S108 (Step S106). Subsequently, the information processing apparatus 1 restores the distance to the distance measurement target with high accuracy based on the synthesized motion vector.

Then, the information processing apparatus 1 determines whether or not the process has ended (Step S107). When it is determined that the process has not ended (Step S107), the information processing apparatus 1 returns to Step S101. Furthermore, when it is determined that the process has ended (Step S107, Yes), the information processing apparatus 1 ends the process.

Note that the above-described embodiment refers to the case where the information processing apparatus 1 includes the first MV estimation unit 3 and the second MV estimation unit 4. However, the information processing apparatus 1 can omit the second MV estimation unit 4. Even when a configuration in which the second MV estimation unit 4 is omitted, the information processing apparatus 1 can improve the distance measurement accuracy in a dark place or in a backlight condition.

[7. Effects]

Information processing apparatus 1 includes the estimation unit (first MV estimation unit 3 and second MV estimation unit 4) and a correction unit (high-precision restoration unit 7). The estimation unit (first MV estimation unit 3 and second MV estimation unit 4) estimates the motion vector of the distance measurement target based on the distance information D3 on the distance to the distance measurement target input from the distance measuring device (ToF sensor) that measures the distance to the distance measurement target and the motion information D1 of the distance measuring device (ToF sensor) input from the motion detection device (IMU) that detects a motion of the distance measuring device (ToF sensor). The correction unit (high-precision restoration unit 7) corrects the distance information based on the motion vector of the distance measurement target estimated by the estimation unit (first MV estimation unit 3 and second MV estimation unit 4). The motion information of the distance measuring device detected by the motion detection device is not affected by disturbance such as surrounding brightness. As a result, the information processing apparatus 1 can improve the distance measurement accuracy even in a dark place or in a backlight condition.

The distance measuring device (ToF sensor) emits infrared light to capture the frame image of the distance measurement target, and outputs the distance map D4 indicating the distance distribution to the distance measurement target in the frame image to the estimation unit (first MV estimation unit 3 and second MV estimation unit 4) as the distance information D3. The estimation unit (first MV estimation unit 3 and second MV estimation unit 4) estimates the motion vector of the distance measurement target from the past frame toward the current frame based on the motion information D1 of the distance measuring device (ToF sensor) and the distance map D4 of the past frame. Since the information processing apparatus 1 estimates the motion vector of the distance measurement target using the infrared light and the motion information D1 that are not affected by the surrounding brightness, the distance measurement accuracy can be improved even in a dark place or in a backlight condition.

In addition, in a general simultaneous localization and mapping (SLAM) technique, a visible light camera is used in combination with the ToF sensor, and therefore two image sensors, the ToF sensor and the visible light camera, are required. This has a problem in terms of implementation. On the other hand, according to the information processing apparatus 1, it is possible to realize robust distance measurement performance against disturbance by using the IMU in combination with the ToF sensor, without using the visible light camera.

The distance measuring device (ToF sensor) outputs, to the estimation unit, the intensity information D2 indicating the reflection intensity distribution in the frame image of infrared light reflected by the distance measurement target. The estimation unit (first MV estimation unit 3 and second MV estimation unit 4) estimates the motion vector of the distance measurement target based on the color dependency map D5 in which the distance-dependent component is removed from the intensity information D2 using the distance map D4. As a result, since the color dependency map D5 is further added as an estimation material of the motion vector, the information processing apparatus 1 can further improve the distance measurement accuracy.

Since the distance map does not have the texture information of the subject in the general SLAM technique, the estimation accuracy of the motion vector is improved by using the visible light image together. On the other hand, in the information processing apparatus 1, since the color information of the subject can be acquired by using the reflection intensity distribution of the infrared light used in the ToF sensor, more accurate estimation of the motion vector can be realized.

The second MV estimation unit 4 estimates the motion vector of the distance measurement target by matching the color dependency map of the current frame (intensity information D2) with the color dependency map of the previous frame (intensity information D21). As described above, the information processing apparatus 1 can improve the distance measurement accuracy by using a multi-frame addition technique used in image quality improvement for improving the accuracy of estimating the motion vector of the distance measurement target.

The estimation unit (second MV estimation unit 4) converts the position of the distance measurement target in the image of the previous frame into the position of the distance measurement target in the image of the current frame based on the motion information of the distance measuring device (ToF sensor). Then, the second MV estimation unit 4 converts the position of the distance measurement target in the image of the current frame into the reflection intensity distribution in the image of the current frame based on the change amount of the position of the distance measurement target before and after conversion, thereby generating the color dependency map of the previous frame (intensity information D21). As described above, since the information processing apparatus 1 generates the color dependency map of the previous frame in consideration of the movement of the distance measuring device (ToF sensor) itself, the distance measurement accuracy can be improved when the distance measuring device (ToF sensor) is mounted on a moving body such as a vehicle.

The estimation unit (second MV estimation unit 4) expands the range to search the distance measurement target in the image of the previous frame when the integrated standard deviation of luminance of the past distance measurement target image is equal to or greater than the predetermined threshold. As a result, the information processing apparatus 1 can improve the distance measurement accuracy even when variation in the position of the distance measurement target in the past image is large.

The estimation unit (the first MV estimation unit 3 and the second MV estimation unit 4) determines the estimation result of the motion vector based on the first motion vector estimated based on the motion information D1 of the distance measuring device (ToF sensor) and the distance map D4 of the past frame and the second motion vector estimated based on the color dependency map D5. As a result, the information processing apparatus 1 can determine an accurate motion vector by using two types of motion vectors from the image of one frame.

The estimation unit (first MV estimation unit 3 and second MV estimation unit 4) synthesizes the first motion vector and the second motion vector according to the reliability of the motion vector calculated from each of the distance map D4 and the color dependency map D5, and determines the estimation result of the motion vector of the distance measurement target. As a result, the information processing apparatus 1 can determine the motion vector with high reliability.

The correction unit (high-precision restoration unit 7) corrects the distance information by adding the distance map D4 and the color dependency map D5 of the plurality of frames, which are two-dimensional information. As a result, the information processing apparatus 1 can, for example, reduce a processing load as compared with a case where three-dimensional information obtained from the visible light image is used.

In the information processing method, the information processing apparatus 1 estimates the motion vector of the distance measurement target based on the distance information D3 of the distance measurement target input from the distance measuring device (ToF sensor) that measures the distance to the distance measurement target and the motion information D1 of the distance measuring device (ToF sensor) input from the motion detection device (IMU) that detects the motion of the distance measuring device (ToF sensor), and corrects the distance information based on the estimated motion vector of the distance measurement target. As a result, the information processing apparatus 1 can improve the distance measurement accuracy even in a dark place or in a backlight condition.

An information processing program causes the information processing apparatus 1 to execute the process of estimating the motion vector of the distance measurement target based on the distance information D3 of the distance measurement target input from the distance measuring device (ToF sensor) that measures the distance to the distance measurement target and the motion information D1 of the distance measuring device input from the motion detection device (IMU) that detects the motion of the distance measuring device (ToF sensor), and correcting the distance information based on the motion vector of the distance measurement target estimated by the estimation unit. As a result, the information processing apparatus 1 can improve the distance measurement accuracy even in a dark place or in a backlight condition.

Note that the effects described in the present specification are merely examples and not limited, and other effects may be provided.

Note that the present technology can also have the following configurations.

(1)

An information processing apparatus including:

an estimation unit configured to estimate a motion vector of a distance measurement target based on distance information on a distance to the distance measurement target, the distance information being input to the estimation unit from a distance measuring device that measures the distance to the distance measurement target, and motion information of the distance measuring device, the motion information being input to the estimation unit from a motion detection device that detects a motion of the distance measuring device; and a correction unit configured to correct the distance information based on the motion vector of the distance measurement target estimated by the estimation unit.

(2)

The information processing apparatus according to (1), wherein the distance measuring device emits infrared light and captures a frame image of the distance measurement target, and outputs, to the estimation unit, a distance map indicating a distribution of the distance to the distance measurement target in the frame image, the distance map being output as the distance information, and the estimation unit estimates the motion vector of the distance measurement target from a past frame toward a current frame based on the motion information of the distance measuring device and the distance map of the past frame.

(3)

The information processing apparatus according to (2), wherein the distance measuring device outputs, to the estimation unit, intensity information indicating a reflection intensity distribution of the infrared light reflected by the distance measurement target in the frame image, and the estimation unit estimates the motion vector of the distance measurement target based on a color dependency map in which a distance-dependent component is removed from the intensity information using the distance map.

(4)

The information processing apparatus according to (3), wherein the estimation unit estimates the motion vector of the distance measurement target by matching the color dependency map of the current frame and the color dependency map of a previous frame.

(5)

The information processing apparatus according to (4), wherein the estimation unit generates the color dependency map of the previous frame by converting a position of the distance measurement target in an image of the previous frame into a position of the distance measurement target in an image of the current frame based on the motion information of the distance measuring device, and converting the position of the distance measurement target in the image of the current frame into the reflection intensity distribution in the image of the current frame based on a change amount of the position of the distance measurement target before and after conversion.

(6)

The information processing apparatus according to (5), wherein the estimation unit enlarges a search range of the distance measurement target in the image of the previous frame when an integrated standard deviation of luminance of a past image of the distance measurement target is equal to or greater than a predetermined threshold.

(7)

7. The information processing apparatus according to any one of (3) to (6), wherein the estimation unit determines an estimation result of the motion vector based on a first motion vector that is estimated based on the motion information of the distance measuring device and the distance map of the past frame and a second motion vector that is estimated based on the color dependency map.

(8)

The information processing apparatus according to (7) wherein the estimation unit determines the estimation result of the motion vector of the distance measurement target by synthesizing the first motion vector and the second motion vector according to reliability of the motion vector calculated from each of the distance map and the color dependency map.

(9)

The information processing apparatus according to any one of (3) to (8), wherein the correction unit corrects the distance information by adding the distance map and the color dependency map of a plurality of frames, the distance map and the color dependency map being two-dimensional information.

(10)

An information processing method executed by an information processing apparatus, including:

estimating a motion vector of a distance measurement target based on distance information on a distance to the distance measurement target, the distance information being input from a distance measuring device that measures the distance to the distance measurement target, and motion information of the distance measuring device, the motion information being input from a motion detection device that detects a motion of the distance measuring device; and correcting the distance information based on estimated motion vector of the distance measurement target.

(11)

An information processing program causing an information processing apparatus to execute:

estimating a motion vector of a distance measurement target based on distance information on a distance to the distance measurement target, the distance information being input from a distance measuring device that measures the distance to the distance measurement target, and motion information of the distance measuring device, the motion information being input from a motion detection device that detects a motion of the distance measuring device; and correcting the distance information based on estimated motion vector of the distance measurement target.

REFERENCE SIGNS LIST

1 INFORMATION PROCESSING APPARATUS
2 COLOR DEPENDENCY MAP GENERATION UNIT
3 FIRST MV ESTIMATION UNIT
4 SECOND MV ESTIMATION UNIT
5 MV SYNTHESIS UNIT
6 RELIABILITY CALCULATION UNIT
7 HIGH-PRECISION RESTORATION UNIT

The invention claimed is:

1. An information processing apparatus, comprising:

an estimation unit configured to:

receive distance information of a distance measurement target from a distance measuring device, wherein the distance measuring device:

emits infrared light toward the distance measurement target, receives reflected light of the infrared light reflected by the distance measurement target, captures a plurality of frame images of the distance measurement target based on the received reflected light, outputs, as the distance information, a distance map corresponding to each frame image of the plurality of frame images, and outputs intensity information corresponding to each frame image of the plurality of frame images, the distance map corresponding to each frame image of the plurality of frame images indicates a distribution of a distance of the distance measurement target from the distance measuring device, and the intensity information corresponding to each frame image of the plurality of frame images indicates a reflection intensity distribution of the reflected light;

receive, from a motion detection device, motion information of a motion of the distance measuring device; and estimate a first motion vector of the distance measurement target from a past frame image of the plurality of frame images toward a current frame image of the plurality of frame images, wherein the estimation of the first motion vector is based on the distance map corresponding to the current frame image, the distance map corresponding to the past frame image, and the motion information;

a color dependency map generation unit configured to generate, based on the distance map corresponding to the past frame image, a color dependency map corresponding to each frame image of the plurality of frame images by removal of a distance-dependent component from the intensity information, wherein the estimation unit is further configured to estimate a second motion vector of the distance measurement target based on the color dependency map; and a correction unit configured to correct the distance information based on the first motion vector and the second motion vector of the distance measurement target.

2. The information processing apparatus according to claim 1, wherein the estimation unit is further configured to:
   match the color dependency map corresponding to the current frame image with the color dependency map corresponding to the past frame image; and
   estimate the second motion vector based on the match.

3. The information processing apparatus according to claim 2, wherein the estimation unit is further configured to:
   generate the color dependency map corresponding to the past frame image by conversion of a first position of the distance measurement target in of the past frame image into a second position of the distance measurement target in the current frame image,
      wherein the conversion is based on the motion information;
   determine a change amount of the second position of the distance measurement target from the first position of the distance measurement target; and
   convert the second position of the distance measurement target into the reflection intensity distribution based on the determined change amount.

4. The information processing apparatus according to claim 3, wherein the estimation unit is further configured to:
   determine an integrated standard deviation of luminance of the past frame image is equal to or greater than a threshold; and
   enlarge a search range of the distance measurement target in the past frame image, based on the determination that the integrated standard deviation of luminance of the past frame image is equal to or greater than the threshold.

5. The information processing apparatus according to claim 1, further comprising a synthesis unit configured to determine a third motion vector of the distance measurement target based on the first motion vector and the second motion vector.

6. The information processing apparatus according to claim 5, further comprising a reliability calculation unit configured to calculate a reliability of each of the first motion vector and the second motion vector, based on the distance map and the color dependency map,
   wherein the synthesis unit is further configured to:
      synthesize the first motion vector and the second motion vector based on the calculated reliability; and
      determine the third motion vector based on the synthesis of the first motion vector and the second motion vector.

7. The information processing apparatus according to claim 1, wherein
   the correction unit is further configured to correct the distance information by addition of the distance map and the color dependency map corresponding to the plurality of frame images, and
   the distance map and the color dependency map are two-dimensional information.

8. An information processing method, comprising:
   in an information processing apparatus:
      receiving distance information of a distance measurement target from a distance measuring device, wherein
         the distance measuring device:
            emits infrared light toward the distance measurement target,
            receives reflected light of the infrared light reflected by the distance measurement target,
            captures a plurality of frame images of the distance measurement target based on the received reflected light,
            outputs, as the distance information, a distance map corresponding to each frame image of the plurality of frame images, and
            outputs intensity information corresponding to each frame image of the plurality of frame images,
         the distance map corresponding to each frame image of the plurality of frame images indicates a distribution of a distance of the distance measurement target from the distance measuring device, and
         the intensity information corresponding to each frame image of the plurality of frame images indicates a reflection intensity distribution of the reflected light;
      receiving, from a motion detection device, motion information of a motion of the distance measuring device;
      estimating a first motion vector of the distance measurement target from a past frame image of the plurality of frame images toward a current frame image of the plurality of frame images,
         wherein the estimation of the first motion vector is based on the distance map corresponding to the current frame image, the distance map corresponding to the past frame image, and the motion information;
      generating, based on the distance map corresponding to the past frame image, a color dependency map corresponding to each frame image of the plurality of frame images by removal of a distance-dependent component from the intensity information;
      estimating a second motion vector of the distance measurement target based on the color dependency map; and
      correcting the distance information based on the first motion vector and the second motion vector of the distance measurement target.

9. A non-transitory computer-readable medium having stored thereon, computer-executable instructions which, when executed by a processor, cause the processor to execute operations, the operations comprising:
   receiving distance information of a distance measurement target from a distance measuring device, wherein
      the distance measuring device:
         emits infrared light toward the distance measurement target,
         receives reflected light of the infrared light reflected by the distance measurement target,
         captures a plurality of frame images of the distance measurement target based on the received reflected light,
         outputs, as the distance information, a distance map corresponding to each frame image of the plurality of frame images, and
         outputs intensity information corresponding to each frame image of the plurality of frame images,
      the distance map corresponding to each frame image of the plurality of frame images indicates a distribution of a distance of the distance measurement target from the distance measuring device, and
      the intensity information corresponding to each frame image of the plurality of frame images indicates a reflection intensity distribution of the reflected light;

receiving, from a motion detection device, motion information of a motion of the distance measuring device;

estimating a first motion vector of the distance measurement target from a past frame image of the plurality of frame images toward a current frame image of the plurality of frame images, wherein the estimation of the first motion vector is based on the distance map corresponding to the current frame image, the distance map corresponding to the past frame image, and the motion information;

generating, based on the distance map corresponding to the past frame image, a color dependency map corresponding to each frame image of the plurality of frame images by removal of a distance-dependent component from the intensity information;

estimating a second motion vector of the distance measurement target based on the color dependency map; and correcting the distance information based on the first motion vector and the second motion vector of the distance measurement target.

\* \* \* \* \*